(12) United States Patent
Dimitriu

(10) Patent No.: US 8,675,776 B2
(45) Date of Patent: *Mar. 18, 2014

(54) MAJORITY DETECTOR APPARATUS, SYSTEMS, AND METHODS

(71) Applicant: Micron Technology, Inc., Boise, ID (US)

(72) Inventor: Dragos Dimitriu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,616

(22) Filed: Feb. 4, 2013

(65) Prior Publication Data

US 2013/0142285 A1 Jun. 6, 2013

Related U.S. Application Data

(63) Continuation of application No. 11/952,550, filed on Dec. 7, 2007, now Pat. No. 8,369,452.

(51) Int. Cl.
*H03K 9/00* (2006.01)

(52) U.S. Cl.
USPC ........... 375/316; 375/136; 375/147; 375/224; 375/354; 375/355; 375/360; 375/363; 375/365; 375/373; 375/375

(58) Field of Classification Search
USPC ......... 375/316, 136, 147, 224, 265, 319, 355, 375/360, 363, 365, 373, 375; 331/10, 11, 331/183; 714/704, 760, 799

See application file for complete search history.

(56) References Cited

U.S. PATENT DOCUMENTS

| | | | |
|---|---|---|---|
| 5,896,428 A | 4/1999 | Yanagiuchi | |
| 6,906,562 B1 * | 6/2005 | Nguyen | 327/116 |
| 7,176,730 B2 * | 2/2007 | Chang | 327/156 |
| 7,567,101 B2 | 7/2009 | Yokozeki | |
| 7,668,698 B2 | 2/2010 | Jiang | |
| 7,812,746 B2 | 10/2010 | Le | |
| 7,869,780 B2 | 1/2011 | Youssoufian et al. | |
| 8,121,240 B1 | 2/2012 | Dalvi | |
| 2004/0151035 A1 | 8/2004 | Lisi et al. | |
| 2009/0147885 A1 | 6/2009 | Dimitriu | |

* cited by examiner

*Primary Examiner* — Dhaval Patel

(74) *Attorney, Agent, or Firm* — Schwegman, Lundberg & Woessner, P.A.

(57) ABSTRACT

Apparatus, methods, and systems are disclosed, including, for example, a data receiver to receive a calibration voltage and a reference voltage to calibrate the data receiver. The output of the data receiver is provided to a first ripple counter that counts the outputs from the data receiver and provides an output count. The ripple counter may count either ones or zeros. A second ripple counter counts the number of a clock signals over the same period of time. The output count is either multiplied by two or the count of clock signals is divided by two. A ripple comparator may then compare the outputs and adjust the reference voltage based upon the comparison results.

20 Claims, 12 Drawing Sheets ing the offset

MAJORITY DETECTOR APPARATUS, SYSTEMS, AND METHODS

PRIORITY APPLICATION

This application is a continuation of U.S. application Ser. No. 11/952,550, filed Dec. 7, 2007, which is incorporated herein by reference in its entirety.

BACKGROUND

Data receivers, such as DRAM data receivers, should be extremely precise in order to discern bits at high frequencies. As frequencies increase, data receivers are more sensitive to input referred offset caused by device mismatch. As data is provided to a data receiver, the inputs may be discerned incorrectly causing errors in the system. For example, if the offset between the data provider and the data receiver is high, a bit with a high value may be interpreted as a low value, causing an error. Correction circuits may be utilized to reduce the effects of device mismatch offset. An important part of an offset correction circuit is the majority detector. The majority detector is utilized to help determine the amount of offset that may be needed to reduce or eliminate device mismatch.

To calibrate the system for offset correction one input of a differential data receiver is held at or near a calibration voltage. A variable voltage relative to the calibration voltage is provided to the second input of the differential data receiver. A clock signal is also input into the data receiver. For each active clock edge, a digital output is provided to the majority detector. Assuming the calibration voltage is applied to the non-inverting input of the differential data receiver, the output will be a series of ones if the calibration voltage is sensed to be significantly higher than the variable voltage plus the offset voltage. The output will be a series of zeros if the calibration voltage is sensed to be significantly lower than the variable voltage plus the offset voltage. Mostly due to thermal noise, when the calibration voltage is equal to or approximately equal to the variable voltage, plus the offset voltage, a random series of ones and zeros will be present at the data receiver output.

To calibrate the system, the variable voltage is raised or lowered until a transition is achieved, such as a transition from a greater number of ones than zeros, to a greater number of zeros than ones. For each given variable voltage the system counts the number of "one" bits received over a sensing period. For example, the system may begin with a significantly higher variable voltage than the calibration voltage. In that case the majority detector concludes the number of zeros in the experiment will exceed the number of ones. The system may then incrementally lower the variable voltage after each experiment generating the same conclusion (i.e. a majority of zeros). When the number of zeros detected becomes equal to or less than the number of ones detected within one experiment, as concluded by the majority detector, the variable voltage plus the offset voltage will be equal to or approximately equal to the calibration voltage. Because the variable voltage is relative to the calibration voltage the offset voltage can be determined as the difference of the two, its value stored and used in normal operation.

DETAILED DESCRIPTION

An embodiment includes a compact, sequential majority detect circuit based on a ripple architecture. It consists of two ripple counters and a ripple comparator. One counter counts the total number of bits received, while the other counts only the "ones" received. In order to detect 50% or more "ones" in the series, the shifted (multiplied by 2) value of the "ones" counter is compared to the total number of bits received. The ripple comparator consists of a cascade of 1 bit elements with carry in, carry out ports. The one bit element has only two inverters and two AOI (AND-OR-Inverter) gates and has a two gate propagation delay. The comparator cascade propagates from most significant bit to least significant bit and blocks comparison of all lower ranking bits once an inequality is detected. The ripple comparator relies on the availability of both inverted and non-inverted values in the two counters. The circuit size and maximum propagation delay grow logarithmically with the size of the bit series.

Figure 1:
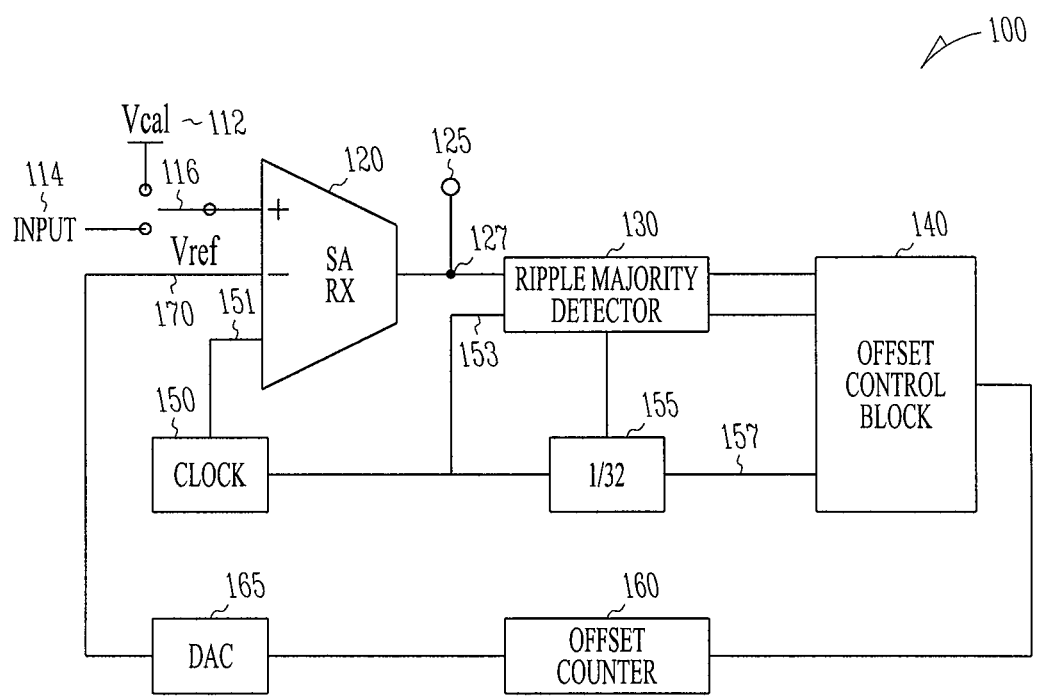
FIG. 1 is a data receiver with calibration circuit, according to an embodiment of the invention.

FIG. 1 is a data receiver calibration circuit 100 according to an embodiment of the invention. The data receiver calibration circuit 100 comprises a data receiver 120. During normal operation a data transmitter will provide a data carrying signal (not necessary digital) to input port 114 of data receiver 120. A reference voltage 170 (Vref) is provided at a second input to the data receiver. Data receiver 120 will restore the transmitted data at digital levels by amplifying the voltage difference between the input port 114 and reference voltage 170 at output node 125. Reference voltage 170 is a variable voltage that is used for both calibration and the operation of the data receiver 120. When the data receiver 120 is to be calibrated, the data receiver calibration circuit 100 obtains a reference voltage 170 equal to a calibration voltage 112 minus an offset voltage of the data receiver 120, thereby calculating the offset voltage of the data receiver 120. When switch 116 provides input 114, the reference voltage 170 is set to one half the average input voltage minus the offset voltage. It is noted that the offset voltage may be negative.

During the calibration process, switch 116 is switched from the input 114 to a calibration voltage Vcal 112. During calibration the output 127 of data receiver 120 is provided to a ripple majority detector 130. The output 127 may be one of two states, either a one or a zero for the duration of each bit. A clock 150 provides a clock signal 151 with the period equal to the duration of a bit to the data receiver 120. The clock 150 also provides a clock signal 151 to ripple majority detector 130 at input 153 and clock signal 151 to clock divider 155. For each clock cycle, data receiver 120 provides a bit to ripple majority detector 130. The ripple majority detector 130 counts the ones bits provided by the data receiver 120 and the total number of clock cycles from clock 150. After a calibration cycle comprising a number of clock cycles, for example 4, 8, 16, or 32 cycles, the ripple majority detector 130 compares the number of ones bits received from data receiver 120 with the total number of clock cycles of the calibration cycle. If two times the number of ones bits is higher than the total number of clock cycles, then the reference voltage 170 plus the internal offset voltage of the data receiver 120 may be lower than the calibration voltage 112. If two times the number of ones bits received is lower than the number of clock cycles, then the reference voltage 170 plus the internal offset voltage of the data receiver 120 is higher than the calibration voltage 112. If two times the number of ones bits received is equal to the number of clock cycles, then the reference voltage 170 plus the internal offset voltage of the data receiver 120 may be approximately equal to the calibration voltage 112.

At the end of the calibration cycle, the ripple majority detector 130 may provide the result to an offset control block 140. Offset control block 140 and the ripple majority detector 130 receive an input from divider 155. Divider 155 divides the clock cycles by a number equal to the length of the calibration cycle. If, for example, the intention was to query the ripple majority detector 130 every 32 cycles, the divider 155 would divide the clock 150 input by 32 and provide a signal to the offset control block 140 once every 32 clock cycles. Based on the majority evaluation of the calibration cycle, the offset control block 140 determines whether to raise the reference voltage 170, lower the reference voltage 170, or maintain the reference voltage 170 and stop the calibration. The offset control block 140, provides a signal to offset counter 160 to either increment or decrement the output provided to DAC 165 (Digital to Analog Converter). DAC 165 is a digital to analog converter that converts the digital input from offset counter 160 into the analog voltage reference 170.

The offset counter 160 may have 2, 4, 6, or 8 bits or greater dependant upon the resolution desired for the reference voltage 170. For example, if it was desired to have a resolution of five millivolts (my) for a range of 80 my, a 4 bit output would be desired. The 4 bit output giving the desired 16 required outputs. As stated if a larger range or finer resolution is desired the size of the offset counter 160 and DAC 165 may be adjusted accordingly.

Figure 2A:
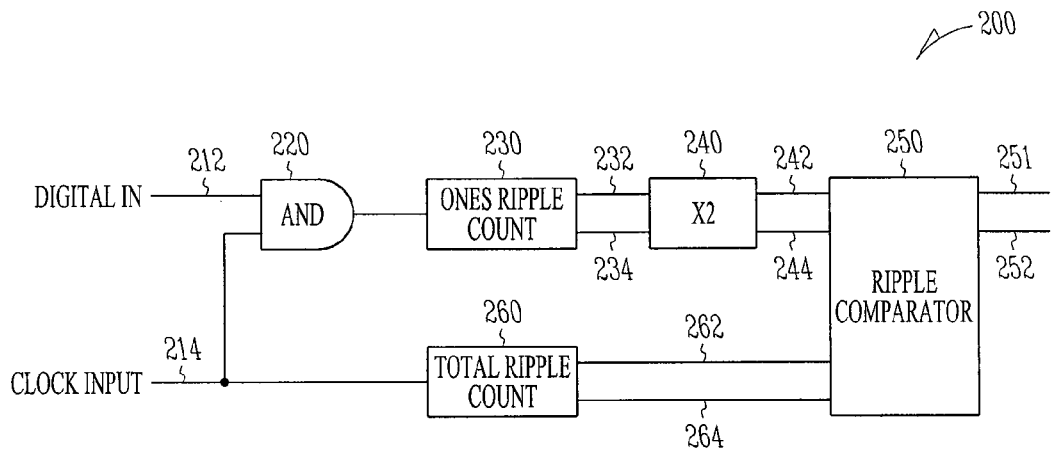
FIG. 2A is a ripple majority detector, according to an embodiment of the invention.

FIG. 2A is a ripple majority detector 200 according to an embodiment of the invention. The output 127 from receiver 120 of FIG. 1 is provided at digital input 212 to an AND gate 220. The clock 150 of FIG. 1 provides an input at clock input 214. AND gate 220 provides an input into ripple counter 230. Ripple counter 230 provides two complementary outputs 232, 234 to an ×2 multiplier 240. It will be assumed that outputs when in binary form are multi-bit outputs. The outputs 232 and 234 are multiplied by 2 by a 1-bit shift circuit, multiplier 240. The outputs of multiplier 240 are outputs 242 and 244. Output 242 is the number of ones counts times 2 and output 244 is the compliment. For example if the count of ones was 4 or 0100, the compliment would be 1011. The times two count or output 242 would be 1000 and the compliment would be 0111. The output 242 will also be referred to as B. The second output 244 of multiplier 240 is the complementary output of B, BF.

A total ripple counter 260 receives the clock signal 214 and counts the total number of clock cycles. Total ripple counter 260 provides a count (A) to output 262 and the complementary of the count (AF) at output 264. Outputs 242, 244, 262, and 264 are provided to ripple comparator 250. Ripple comparator 250 provides two outputs 251 and 252 to offset control block 140 of FIG. 1. Output 251 will be a one if A or output 262 is greater than or equal to B (output 242). Output 252 will be one if B or output 242 is greater than or equal to A (output 262). If the A bit is one and the B bit is zero, Vref 170 plus the internal offset voltage of the data receiver 120 of FIG. 1 is greater than Vcal 112 of FIG. 1. If the A bit is zero and the B bit is one, Vref 170 plus the internal offset voltage of the data receiver 120 is less than Vcal 112. If the A bit is one and the B bit is one, then Vref 170 plus the internal offset voltage of the data receiver 120 is approximately equal to Vcal 112. The operation of ripple comparator is explained further in FIGS. 5 through 9.

Figure 2B:
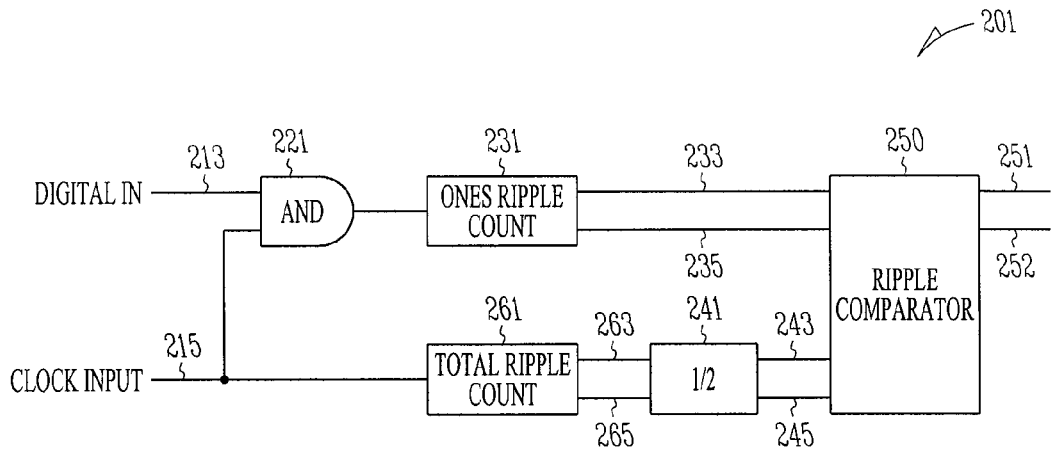
FIG. 2B is a ripple majority detector, according to an embodiment of the invention.

FIG. 2B is a ripple majority detector 201 according to an embodiment of the invention. The operation of ripple majority detector 201 is similar to the operation of ripple majority detector 200. However, the operation of ripple detector 201 divides the total ripple count of the clock cycles by two instead of multiplying the ones ripple count. The output 127 from receiver 120 of FIG. 1 is provided at digital input 213 to an AND gate 221. The clock 150 of FIG. 1 provides an input at clock input 215. AND gate 221 provides an input into ripple counter 231. Ripple counter 231 provides two complementary outputs 233 and 235 expressing the number of ones count. The outputs 233 and 235 may also be referred to as B and BF respectively.

A total ripple counter 261 receives the clock signal 215 and counts the total number of clock cycles. Total ripple counter 261 provides a count to output 263 and the complementary of the count at output 265 to divider 241. The outputs 263 and 265 are divided by two by a 1-bit shift circuit, divider 241. The outputs of divider 241 are output 243 also referred to as A and output 245 also referred to as AF. Outputs 233, 235, 243, and 245 are provided to ripple comparator 250. Ripple comparator 250 provides two outputs 251 and 252 to offset control block 140 of FIG. 1. Output 251 will be a one if A or output 243 is greater than or equal to B (output 233). Output 252 will be one if B or output 235 is greater than or equal to A (output 245). If the A bit is one and the B bit is zero, Vref 170 plus the internal offset voltage of the data receiver 120 of FIG. 1 is greater than Vcal 112 of FIG. 1. If the A bit is zero and the B bit is one, Vref 170 plus the internal offset voltage of the data receiver 120 is less than Vcal 112. If the A bit is one and the B bit is one, then Vref 170 plus the internal offset voltage of the data receiver 120 is approximately equal to Vcal 112.

Figure 3:
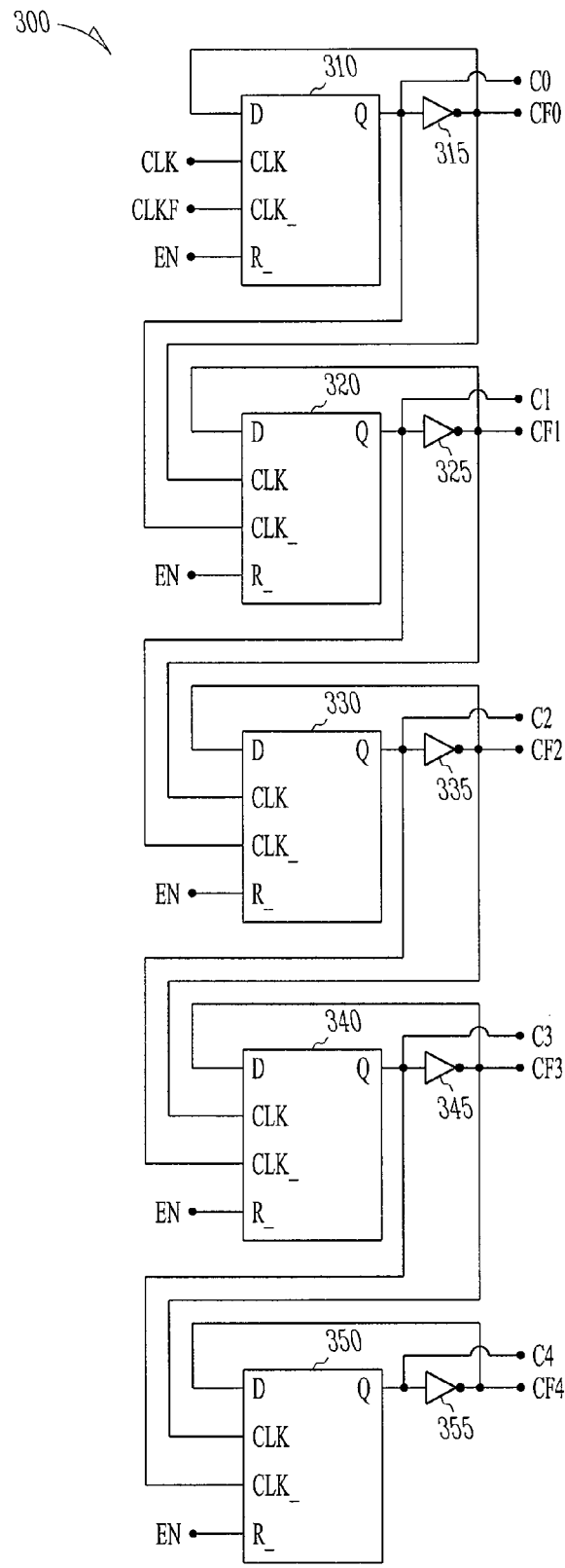
FIG. 3 is a ripple counter, according to an embodiment of the invention.

FIG. 3 is a ripple counter 300 according to an embodiment of the invention. The ripple counter 300 may be utilized as a total ripple counter 260 of FIG. 2 and counts the clock cycles. A ripple counter 300 could also be utilized as ones ripple counter 230 of FIG. 2. The ripple counter 300 comprises five D Flip-Flops, 310, 320, 330, 340 and 350 and five inverters 315, 325, 335, 345, and 355. For use as a total ripple counter, three inputs are provided to flip-flop 310, a clock input to CLK, and the inverse of the clock input CLKF to CLK_. The output Q of flip-flop 310 is C0 and is provided to inverter 315. The output of inverter 315 is the inverse of C0, CF0. CF0 is provided to the input D of flip-flop 310 and the CLK input to flip-flop 320. C0 is provided to the input CLK_ of flip-flop 320. The output Q of flip-flop 320 is C1 and is provided to inverter 325. The output of inverter 325 is the inverse of C1, CF1. CF1 is provided to the input D of flip-flop 320 and the CLK input to flip-flop 330. C1 is provided to the input CLK_ of flip-flop 330. The output Q of flip-flop 330 is C2 and is provided to the inverter 335. The output of inverter 335 is the inverse of C2, CF2. CF2 is provided to the input D of flip-flop 330 and the CLK input to flip-flop 340. C2 is provided to the input CLK_ of flip-flop 340. The output Q of flip-flop 340 is C3 and is provided to the inverter 345. The output of inverter 345 is the inverse of C3, CF3. CF3 is provided to the input D of flip-flop 340 and the CLK input to flip-flop 350. C3 is provided to the input CLK_ of flip-flop 350. The output Q of flip-flop 350 is C4 and is provided to the inverter 355. The output of inverter 355 is the inverse of C4, CF4. CF4 is provided to the input D of flip-flop 350. The output C0-C4 represents the clock count in binary form or A, output 262 or 263 of FIG. 2. The output CF0-CF4 represent AF in binary format, output 264 or 265 of FIG. 2. Ripple counter 300 depicts a ripple counter to count clock cycles. In a like manner ripple counter 300 may be utilized to count the ones inputs to ones ripple count 230.

Figure 4A:
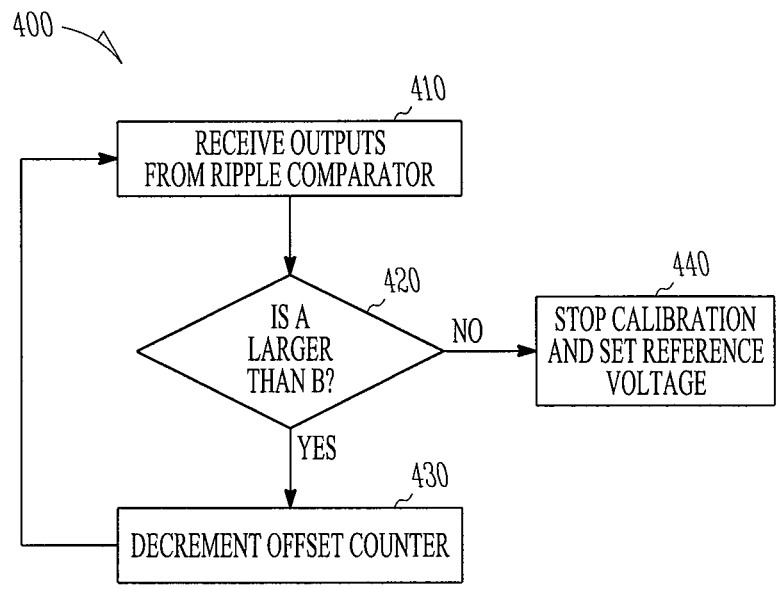
FIG. 4A is a flow chart of the function performed by the offset control block when Vref is initially set above the Vcal, according to an embodiment of the invention.

FIG. 4A is flow chart of the function 400 performed by the offset control block 140 of FIG. 1 when Vref 170 is initially set above Vcal 112 according to an embodiment of the invention. As stated, function 400 is provided when the initial setting of Vref 170 is higher than Vcal 112. Activity 410 receives the outputs 251 representing A and 252 representing B according to FIG. 2. Activity 420 compares A and B. If A is larger than B then the process will initiate activity 430. If A is not larger than B, activity 440 is initiated. Activity 430 decrements the offset counter 160 of FIG. 1 and reinitiate activity 410. Following the process, Vref will be decremented until two times number of one bits detected exceeds or is equal to the number of clock cycles. In some embodiments a system continues until B is greater than A and does not stop when they are equal to assure that Vref plus the internal offset voltage of the data receiver has transitioned past Vcal. Activity 440 stops the calibration cycles and sets the reference voltage 170 of FIG. 1.

Figure 4B:
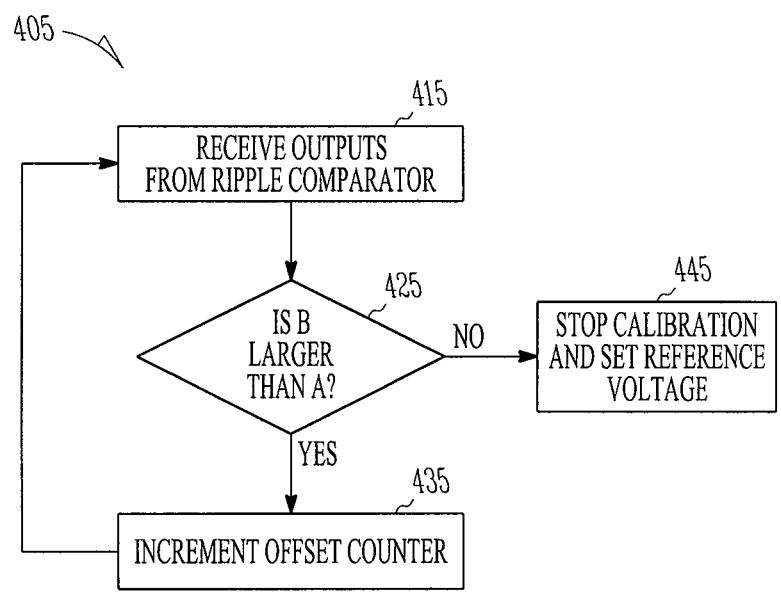
FIG. 4B is a flow chart of the function performed by the offset control block when Vref is initially set below Vcal, according to an embodiment of the invention.

FIG. 4B is flow chart of the function 405 performed by the offset control block 140 of FIG. 1 when Vref 170 is initially set below Vcal 112 according to an embodiment of the invention. As stated, function 405 is provided when the initial setting of Vref 170 plus the internal offset voltage of the data receiver 120 is below Vcal 112. Activity 415 receives the inputs 251 representing A and 252 representing B according to FIG. 2. Activity 425 compares A and B. If B is larger than A then the process will initiate activity 435. If A is not larger than B, activity 445 is initiated. Activity 435 increments the offset counter 160 of FIG. 1 and reinitiate activity 415. Following the process, Vref will be incremented until two times number of ones bits detected is less than or is equal to the number of clock cycles. In some embodiments, a system continues until B is less than A and does not stop when they are equal to assure that Vref has transitioned past Vcal. Activity 445 stops the calibration cycles and set the reference voltage 170 of FIG. 1.

Figure 5:
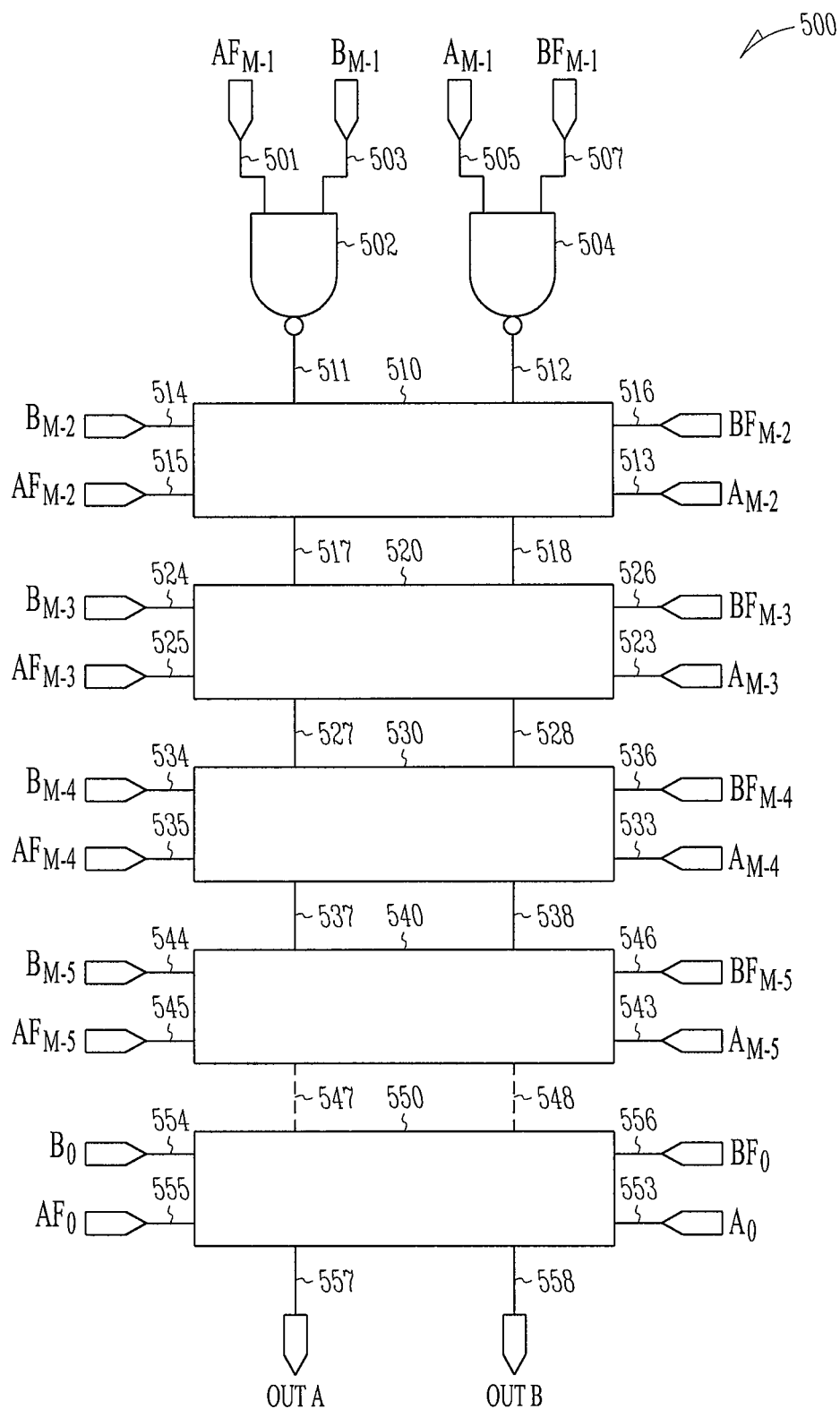
FIG. 5 is a ripple comparator, according to an embodiment of the invention.

FIG. 5 is a ripple comparator 500 according to an embodiment of the invention. Ripple comparator 500 comprises a plurality of comparator blocks 510, 520, 530, 540, and 550. Ripple comparator 500 represents a M bit ripple comparator which if M equals five it will compare the inputs for 32 cycles. The operation of the comparator blocks 510, 520, 530, 540, and 550 will be detailed in the following figures. The most significant bits AM-1, and BM-1 may not be tied directly to inputs 511 and 512 respectively. Because AM-1 and BM-1 may be zero, the most significant bits AM-1 at 505 and BM-1 at 503 along with their compliments, AFM-1 at 501 and BFM-1 at 507 are provided to a pair of NAND gates 502 and 504. The most significant bit for A, $A_{M-1}$, is provided at input 505 and the most significant bit for B, $B_{M-1}$, is provided at input 503. The compliments to $A_{M-1}$ and $B_{M-1}$, $AF_{M-1}$ and $BF_{M-1}$ respectively are provided at inputs 501 and 507. The output will be a one at outputs 511 and 512 if both $A_{M-1}$ and $B_{M-1}$ are equal. Comparator block 510 first determines if $A_{M-1}$ is greater than $B_{M-1}$ which is $A_{M-1}=1$ and $B_{M-1}=0$. If $A_{M-1}$ is greater than $B_{M-1}$, then output 517 will provide a one as the output and output 518 will provide a zero as the output. Once a zero is present to an output it will pass through each of the comparator blocks beneath, regardless of the corresponding A, AF, B, BF inputs, until it is provided at Out B 558 or Out A 557.

The second most significant bits $A_{M-2}$ and $B_{M-2}$ are provided to inputs 513 and 514 respectively. The complementary of the second most significant bits $AF_{M-2}$ and $BF_{M-2}$ are provided to inputs 515 and 516 respectively. If the MSB bits were equal which is $A_{M-2}=B_{M-2}$, the second MSB inputs $A_{M-2}$ and $B_{M-2}$ are compared to determine if A is greater than B. As stated earlier, if a more significant bit was determined to be greater than another significant bit, then the result of the prior block will be passed and the current block will be ignored. In this way each significant bit is queried until the least significant bit $A_0$ and $B_0$ are compared at block 550. Block 520 compares $A_{M-2}$, $AF_{M-3}$, $B_{M-3}$, and $BF_{M-3}$ through inputs 523, 525, 524, and 526 respectively. The outputs 527 and 528 are provided to block 530. Block 530 compares $A_{M-4}$, $AF_{M-4}$, $B_{M-4}$ and $BF_{M-4}$ through inputs 533, 535, 534, and 536 respectively. The outputs 537 and 538 are provided to block 540. Block 540 compares $A_{M-5}$, $AF_{M-5}$, $B_{M-5}$ and $BF_{M-5}$ through inputs 543, 545, 544, and 546 respectively. There may be additional blocks provided as indicated by the dotted line outputs 547 and 548. As shown the outputs 547 and 548 are provided to block 550. Block 550 compares $A_0$, $AF_0$, $B_0$ and $BF_0$, the least significant bits, through inputs 553, 555, 554, and 556 respectively. The outputs 557 and 558 are sampled at the end of the calibration cycle and used to decrement, increment or store the value in offset counter 160 of FIG. 1.

Figure 6:
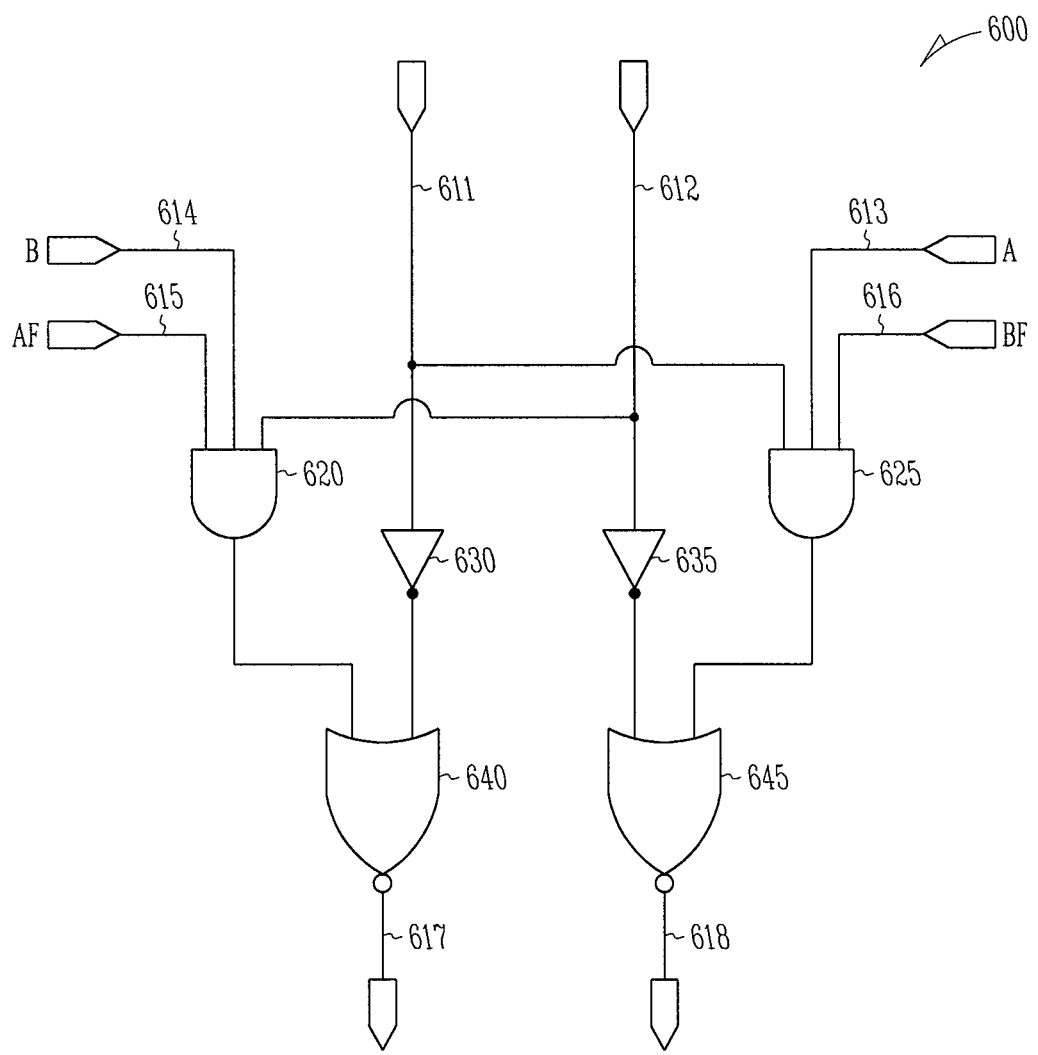
FIG. 6 is a ripple comparator cell, according to an embodiment of the invention.

The operation of the comparator may be best understood by looking at a single comparator block. FIG. 6 is a ripple comparator cell 600, according to an embodiment of the invention. Ripple comparator block 600 may be used to compare one bit from each input A and B. Input 611 receives either the result from the prior comparison or, if it is the first block, the output from NAND gate 502 of FIG. 5. Input 612, receives either the result from the prior comparison or, if it is the first block, the output of NAND gate 504 of FIG. 5. The input 611 is provided to both an inverter 630 and to an AND gate 625. The input 612, is provided to an inverter 635 and AND gate 620. Input 614 receives the next most significant bit B and is provided to AND gate 620. Input 615 provides the compliment of A, AF to AND gate 620. If the input 611, B, and AF are all ones the output of AND gate 620 will be a one. If any of the inputs, input 611, B, or AF are zeros, the output of AND gate 620 will be zero. Input 613 receives the next most significant bit A and is provided to AND gate 625. Input 616 provides the compliment of B, BF, to AND gate 625. If the input 612, A, and BF are all ones, the output of AND gate 625 will be a one. If any of the inputs, input 612, A or BF are zeros, the output of AND gate 625 will be zero.

NOR gate 640 receives the outputs from inverter 630 and AND gate 620. The output of NOR gate 640 will be a zero if either of the outputs of inverter 630 or AND gate 620 are a one. NOR gate 645 receives the outputs from inverter 635 and AND gate 625. The output of NOR gate 645 will be a zero if either of the outputs of inverter 635 or AND gate 625 are a one. As discussed earlier, if input 611 is a zero, then output 617 will also be a zero. In a similar manner, if input 612 is a zero, output 618 will be a zero. In this manner if the comparison of a more significant bit results in a zero output, the zero output will be passed to the final output.

FIG. 6 illustrates the blocks using two three input NAND gates, two inverters, and two NOR gates. Two AOI31's could replace the two three input NAND gates and the two NOR gates. An AOI31 is a three input NAND gate combined with a NOR gate having one output. The use of the AOI31 reduces the propagation delays from three gate propagation delays to two gate propagation delays.

It should be noted that in FIG. 5 the most significant bits $A_{M-1}$, $AF_{M-1}$, $B_{M-1}$, and $BF_{M-1}$ are provided to NAND Gates 502 and 504, other alternatives are also possible. For example, comparator block 600 as described in FIG. 6 could be added to replace NAND gates 502 and 504. The inputs 611 and 612 for the new comparator block 600 would be held as ones. An alternative, if an additional comparator block 600 was added, would be to remove the inputs 611 and 612 for the added comparator block.

Figure 7:
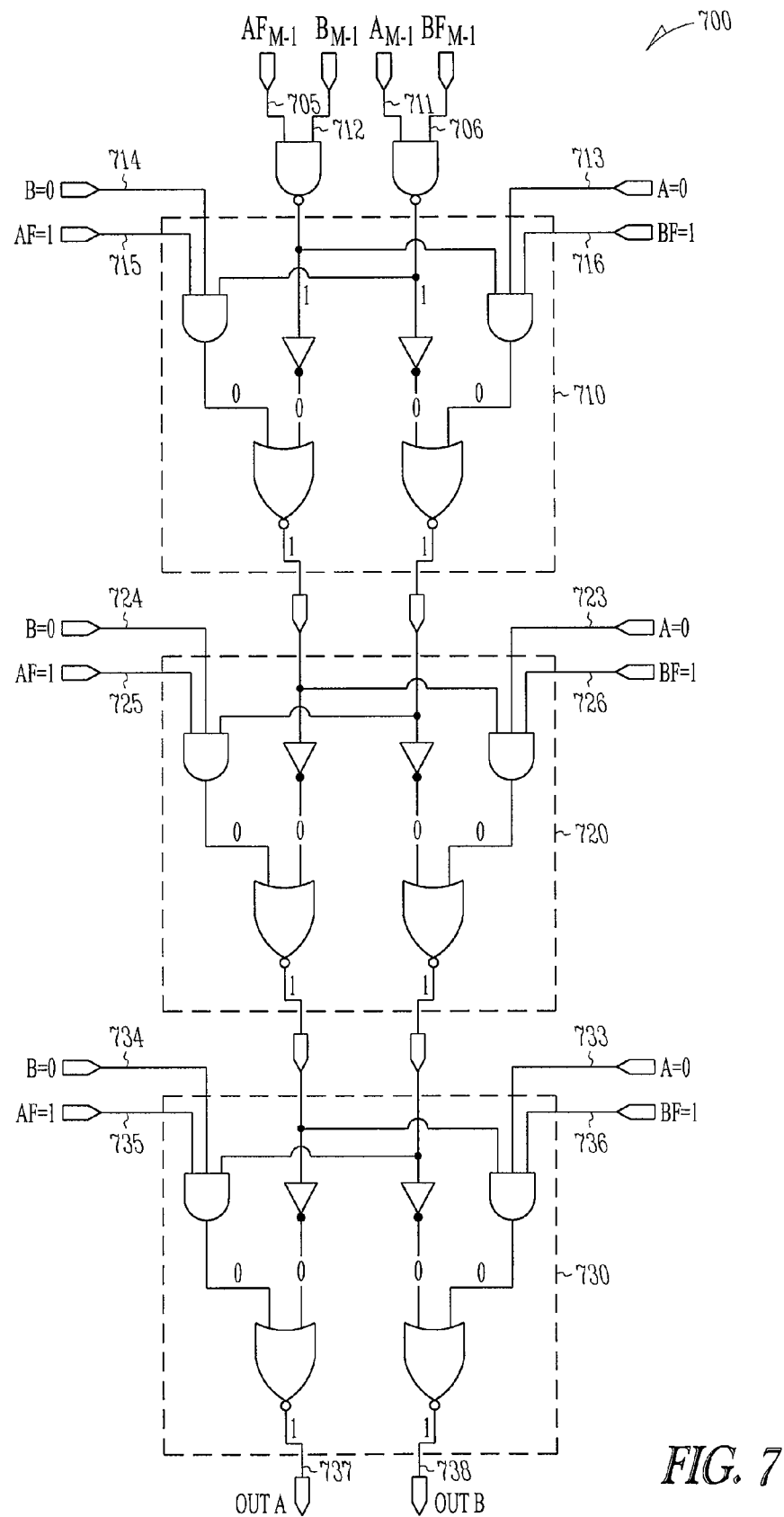
FIG. 7 is a ripple comparator, according to an embodiment of the invention illustrating a count of four ones detected for eight clock cycles.

To clarify operation of the ripple comparator 500 of FIG. 5, FIGS. 7, 8, and 9 represent the operation with various inputs for a ripple comparator according to an embodiment of the invention. FIG. 7 is a ripple comparator 700, according to an embodiment of the invention, illustrating a count of four for ones detected for eight clock cycles. FIG. 7 illustrates the outputs for eight cycles of the clock. Therefore A, the number of clock cycles, in binary is 1000. The number of ones counted is four, therefore, since B is the times two multiple of the number of ones counted, B equals eight or 1000 in binary. Each of the comparator blocks 710, 720, and 730 provide the outputs of the elements of the blocks. The inputs provided at inputs bits for B are input into inputs 712, 714, 724, and 734 from most significant to least significant bits. The inputs into inputs 711, 713, 723, and 733 are A from most significant to least significant bit. The inputs for 705, 715, 725, and 735 are the compliments of the inputs for 711, 713, 723, and 733. The inputs for 706, 716, 726, and 736 are the compliments of the inputs to 712, 714, 724, and 734. Since A is equal to B the outputs 737 and 738 will both be one.

Figure 8:
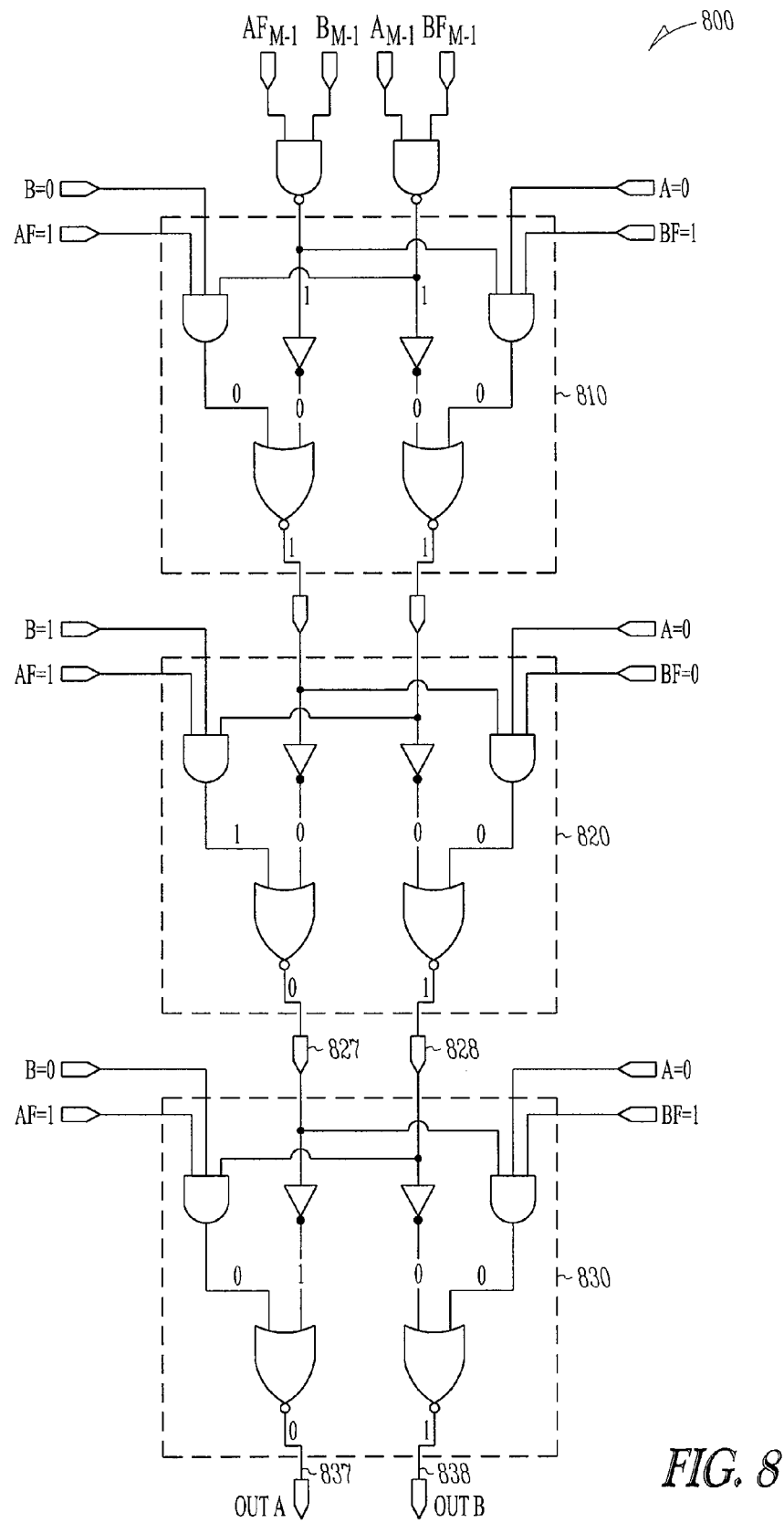
FIG. 8 is a ripple comparator, according to an embodiment of the invention illustrating a count of five ones detected for eight clock cycles.

FIG. 8 is a ripple comparator 800, according to an embodiment of the invention, illustrating a count of five for ones detected for eight clock cycles. Ripple counter 800 operates in the same manner as ripple counter 700 of FIG. 7. However, in this case the count was five and therefore B equals ten or 1010 in binary. The output from comparator block 820 will be zero for 827 and one for 828. This results in the final output at Out A or output 837 being zero and the output at Out B or output 838 being one from block 830. Since A equals 8 and B equals 10, B is greater than A as shown by the result.

Figure 9:
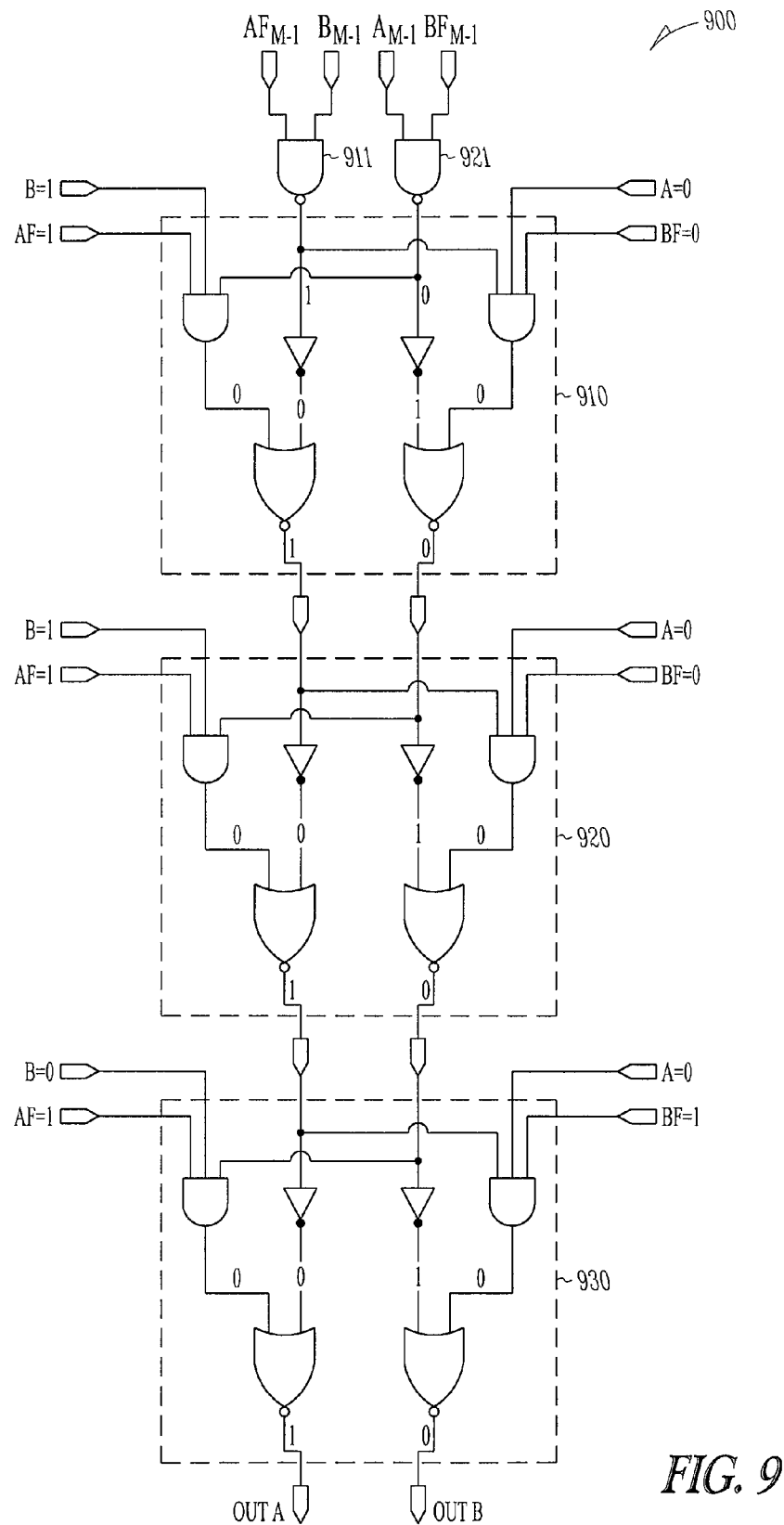
FIG. 9 is a ripple comparator, according to an embodiment of the invention illustrating a count of three ones detected for eight clock cycles.

FIG. 9 is a ripple comparator 900, according to an embodiment of the invention, illustrating a count of three for ones detected for eight clock cycles. Ripple comparator 900 operates in the same manner as ripple comparators 700 and 800. The inputs once again have A equal to 8 or 1000 in binary. The ones count for this example is three making B equal 6 or 0110 in binary. Therefore, as seen, the initial inputs to comparator 910 at NAND gates 911 and 912 are one and zero respectively. Thus, as discussed earlier, the zero will carry through blocks 920 and 930 to the final output Out A and Out B. Which, as stated, A equals eight and B equals six, thus A is greater than B and the outputs show Out A equals one and Out B equals zero.

By implementing the comparator as described in FIGS. 5-9, it is possible to use a simple ripple majority detector 130 as shown in FIG. 1 to count the number of ones and clock cycles. The embodiment does not require the storage of each of the bits received. While the embodiments demonstrated illustrated a ripple majority detector counting the ones bits, in a like manner the system could be modified to count zeros.

Figure 10:
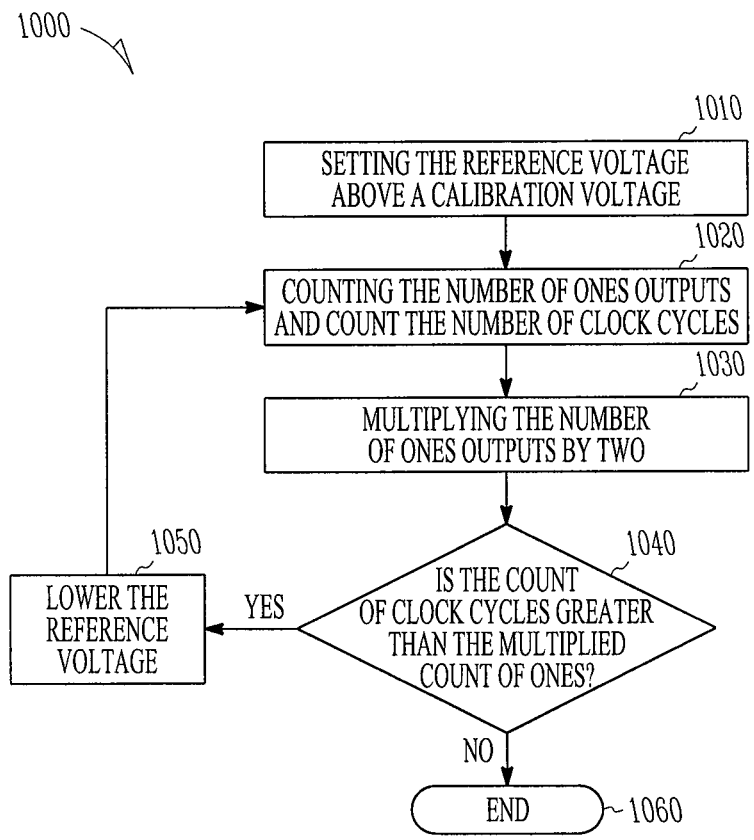
FIG. 10 is a calibration method according to an embodiment of the invention.

FIG. 10 is a calibration method 1000, according to an embodiment of the invention. The calibration method 1000 calibrates a data receiver in accordance with an embodiment of the invention. Activity 1010 sets a reference voltage above a calibration voltage provided to a data receiver, such as data receiver 120 of FIG. 1. Activity 1020 counts the number of ones outputs from the data receiver and counts the number of clock cycles over the same period. Activity 1030 multiplies the number of ones outputs by two. For example if the ones data count was three, or 0011 in binary, by multiplying by two the output in binary is 0110. Activity 1040 compares the times two multiplication with the number of clock cycles. If the number clock cycles is greater than the times two, multiple activity 1050 lowers the reference voltage. While in this case the constant, number of clock cycles is compared to the variable, the times two multiple, is should be understood that comparing the variable to the constant is equivalent. Since the reference voltage is greater than the calibration voltage when the calibration method 1000 initiated, the output of ones data should be lower than the number of clock cycles. By incrementally lowering the reference voltage until the number of ones data bits is greater than or equal to one half the number of clock cycles, it is possible to determine when the reference voltage is approximately equal to the calibration voltage. When the number of clock cycles is less than or equal to the multiplied ones, data activity 1060 will end the process and the reference voltage may be set.

Figure 11:
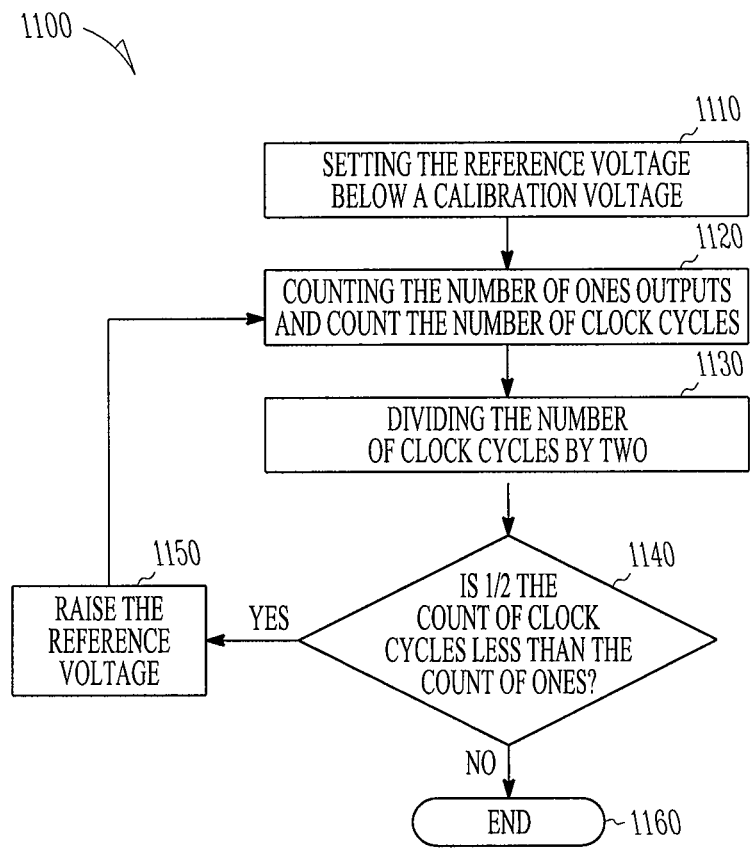
FIG. 11 is a calibration method, according to an embodiment of the invention.

FIG. 11 is a calibration method 1100 according to an embodiment of the invention. The calibration method 1100 calibrates a data receiver in accordance with an embodiment of the invention. Activity 1110 sets a reference voltage below a calibration voltage provided to a data receiver, such as data receiver 120 of FIG. 1. Activity 1120 counts the number of ones outputs or data bits from the data receiver and to count the number of clock cycles over the same period. Activity 1130 divides the number of clock cycles by two. For example, if the number of clock cycles was eight, or 1000 in binary, by dividing by two the output in binary is 0100. Activity 1140 compares the ones data count with one half of the number of clock cycles. If one half of the number clock cycles are less than ones data count, activity 1150 raises the reference voltage. Since the reference voltage is less than the calibration voltage when the calibration method 1100 initiated, the output of ones data should be higher than one half the number of clock cycles. By incrementally raising the reference voltage until the number of ones data bits is greater than or equal to one half the number of clock cycles, it is possible to determine when the reference voltage is approximately equal to the calibration voltage. When one half the number of clock cycles is greater than or equal to the ones, data activity 1160 will end the process and the reference voltage may be set.

Figure 12:
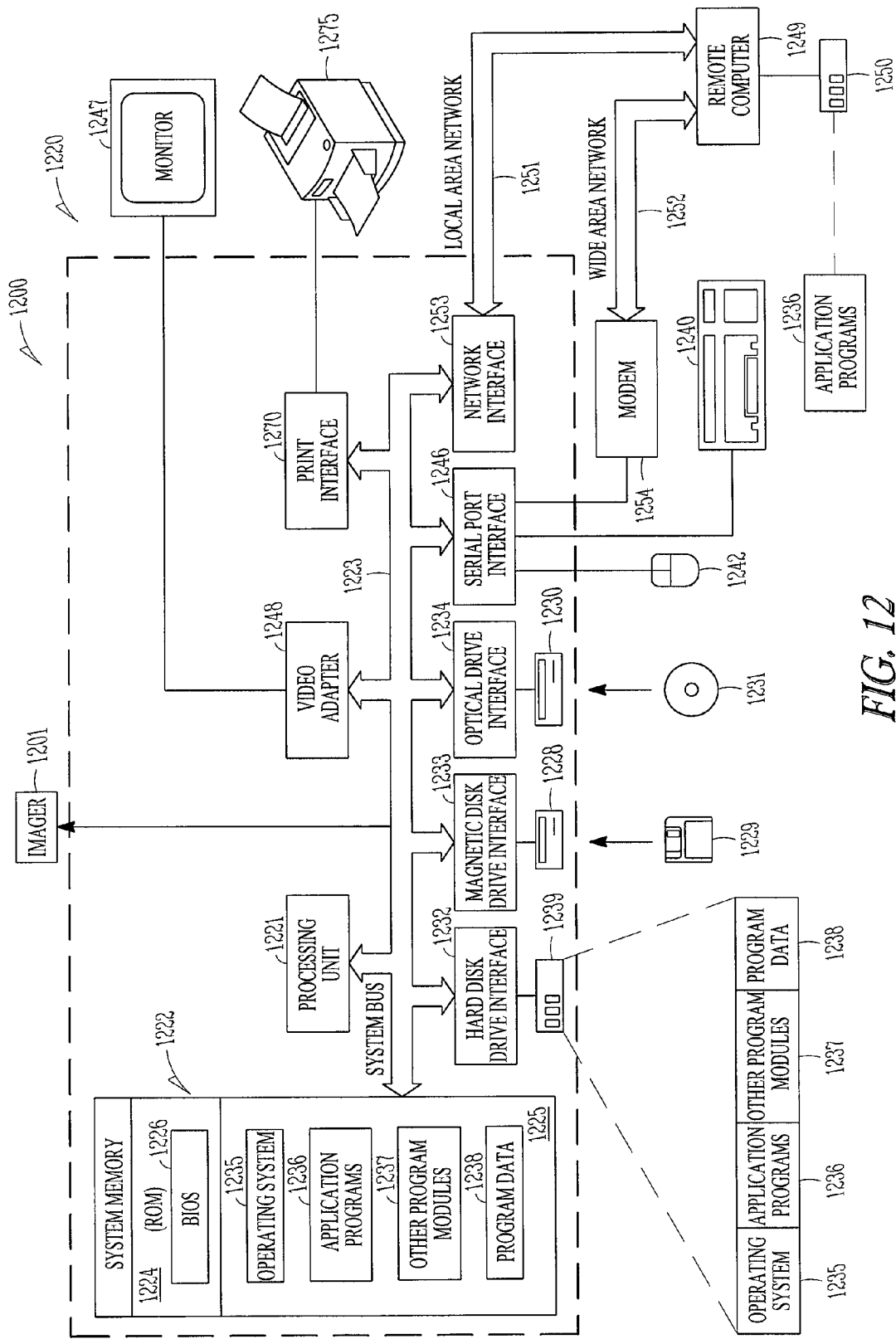
FIG. 12 shows a general purpose computing device, for example a personal computer, which includes processing unit, system memory, and system bus that couples the system memory, and other system components to processing unit, according to an embodiment of the invention.

FIG. 12 shows a general purpose computing device 1200, for example a personal computer, which includes processing unit 1221, system memory 1222, and system bus 1223 that couples the system memory 1222 and other system components to processing unit 1221, according to an embodiment of the invention. System bus 1223 may be any of several types, including a memory bus or memory controller, a peripheral bus, and a local bus, and may use any of a variety of bus structures. System memory 1222 includes read-only memory (ROM) 1224 and random-access memory (RAM) 1225.

A basic input/output system (BIOS) 1226, stored in ROM 1224, contains the basic routines that transfer information between components of personal computer 1220. BIOS 1226 may also contain start-up routines for the system. Personal computer 1220 further includes hard disk drive 1239, magnetic disk drive 1228 for reading from and writing to a removable magnetic disk 1229, and optical disk drive 1230 for reading from and writing to a removable optical disk 1231 such as a CD-ROM (compact disc read only memory), DVD (digital versatile disc or digital video disc), or other optical medium. Hard disk drive 1239, magnetic disk drive 1228, and optical disk drive 1230 are connected to system bus 1223 by a hard-disk drive interface 1232, a magnetic-disk drive interface 1233, and an optical-drive interface 1234, respectively. The drives and their associated computer-readable media provide nonvolatile storage of computer-readable instructions, data structures, program modules, and other data for personal computer 1220. Although the environment described herein employs a hard disk drive 1239, a removable magnetic disk 1229 and a removable optical disk 1231, those skilled in the art will appreciate that other types of computer-readable media that may store data accessible by a computer may also be used in the operating environment. Such media may include magnetic cassettes, flash-memory cards, DVD, Bernoulli cartridges, RAMs, ROMs, and the like.

Program modules may be stored on the hard disk drive 1239, removable magnetic disk 1229, removable optical disk 1231, ROM 1224, and RAM 1225. Program modules may include operating system 1235, one or more application programs 1236, other program modules 1237, and program data 1238. A user may enter commands and information into personal computer 1220 through input devices such as a keyboard 1240 and a pointing device 1242. Other input devices (not shown) may include a microphone, joystick, game pad, satellite dish, scanner, or the like. These and other input devices may be connected to the processing unit 1221 through a serial-port interface 1246 (e.g., universal serial bus (USB)) coupled to system bus 1223, but they may be connected through other interfaces not shown in FIG. 12, such as a parallel port, a game port, Institute of Electrical and Electronics Engineers (IEEE) 1394 port, etc. A monitor 1247 or other display device also connects to system bus 1223 via an interface such as a video adapter 1248. In addition to the monitor, computer 1220 may include other peripheral output devices such as printer 1275. A print interface 1270 may be connected to system bus 1223 and to printer 1275.

Personal computer 1220 may operate in a networked environment using logical connections to one or more remote computers such as remote computer 1249. Remote computer 1249 may be another personal computer, a server, a router, a network PC, a peer device, or other common network node. It typically includes many, or all, of the components described above in connection with personal computer 1220; however, only a remote storage device 1250 is illustrated in FIG. 12. The logical connections depicted in FIG. 12 include local-area network (LAN) 1251 and wide-area network (WAN) 1252. Such networking environments are commonplace in offices, enterprise-wide computer networks, intranets, and the Internet.

When placed in a LAN networking environment, personal computer 1220 connects to LAN 1251 through a network interface or adapter 1253. When used in a WAN networking environment such as the Internet, personal computer 1220 typically includes modem 1254 or other means for establishing communications over WAN 1252. Modem 1254 may be internal or external to personal computer 1220, and connects to system bus 1223 via serial-port interface 1246. In a networked environment, program modules, such as those comprising Microsoft Word®, which are depicted as residing within computer 1220 or portions thereof, may be stored in remote storage device 1250. Of course, the network connections shown are illustrative, and other means of establishing a communications link between the computers may be substituted.

Data receiver calibration circuit 100 of FIG. 1 may be incorporated into memory 1222 to calibrate the outputs of memory 1222 to data receivers in communication with system bus 1223. Data receiver calibration circuit 100 of FIG. 1 may also be found in hard disk drive 1239 to calibrate data receivers found in hard driver 1239.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. An apparatus comprising:
   a receiver to receive a first voltage and a second voltage, and to provide an output based on a voltage difference between the first and second voltages, the output including a plurality of bits;
   a first counter to count a number of bits having a same state among the plurality of bits and provide a bit count;
   a second counter to count a number of clock cycles of a clock signal and provide a clock cycle count; and
   a comparator to compare the clock cycle count with a count derived from the bit count.

2. The apparatus of claim 1, further comprising a multiplier to multiply the bit count to provide the count derived from the bit count.

3. The apparatus of claim 2, wherein the comparator comprises comparator cells to compare the clock cycle count with the count derived from the bit count.

4. The apparatus of claim 2, wherein the comparator comprises comparator cells to compare the clock cycle count with the count derived from the bit count from a most significant bit to a least significant bit.

5. The apparatus of claim 1, further comprising a divider to divide the clock cycle count to provide a divided clock cycle count.

6. The apparatus of claim 5, wherein the comparator comprises comparator cells to compare the plurality of bits of the output count with the divided clock cycle count.

7. The apparatus of claim 5, wherein the comparator comprises comparator cells to compare the plurality of bits of the output count with the divided clock cycle count from the most significant bit to the least significant bit.

8. The apparatus of claim 1, wherein the first counter is configured to count the number of bits having the same state that corresponds to binary one value.

9. The apparatus of claim 1, wherein the first counter is configured to count the number of bits having the same state that corresponds to binary zero value.

10. The apparatus of claim 1, further comprising an offset control block to set the second voltage.

11. An apparatus comprising:
a receiver to receive different voltages including a reference voltage and generate an output based on a voltage difference between the different voltages;
a detector to provide a comparison result based on a number of bits from the output and a number of clock cycles of a clock signal; and
a control block to adjust the reference voltage based on the comparison result provided by the detector.

12. An apparatus comprising:
a receiver to receive different voltages including a reference voltage and generate an output based on the different voltages;
a detector to provide a comparison result based on a number of bits from the output and a number of clock cycles of a clock signal; and
a control block to adjust the reference voltage based on the comparison result provided by the detector, wherein the different voltages include a calibration voltage, and the control block is configured to set the reference voltage higher than the calibration voltage.

13. The apparatus of claim 11, wherein each bit of the number of bits from the output has a binary one value.

14. An apparatus comprising:
a receiver to receive different voltages including a reference voltage and generate an output based on the different voltages;
a detector to provide a comparison result based on a number of bits from the output and a number of clock cycles of a clock signal; and
a control block to adjust the reference voltage based on the comparison result provided by the detector, wherein the control block is configured to raise the reference voltage if the number of bits from the output times two is greater than the number of clock cycles.

15. An apparatus comprising:
a receiver to receive different voltages including a reference voltage and generate an output based on the different voltages;
a detector to provide a comparison result based on a number of bits from the output and a number of clock cycles of a clock signal; and
a control block to adjust the reference voltage based on the comparison result provided by the detector, wherein the different voltages include a calibration voltage, wherein the control block is configured to set the reference voltage lower than the calibration voltage.

16. An apparatus comprising:
a receiver to receive different voltages including a reference voltage and generate an output based on the different voltages;
a detector to provide a comparison result based on a number of bits from the output and a number of clock cycles of a clock signal; and
a control block to adjust the reference voltage based on the comparison result provided by the detector, wherein the control block is configured to raise the reference voltage if the number of bits from the output is greater than the number of clock cycles divided by two.

17. A method comprising:
receiving a first voltage and a second voltage;
providing an output based on a voltage difference between the first and second voltages;
comparing a number of clock cycles of a clock signal with a number of bits derived from a number of bits from the output to provide a comparison a result; and
adjusting the first voltage based on the comparison the result.

18. The method of claim 17, wherein adjusting the first voltage comprises lowering the first voltage if the number of clock cycles is greater than the number of bits derived from the number of bits from the output, and the number of bits derived from the number of bits from the output is two times the number of bits from the output.

19. The method of claim 17, wherein adjusting the first voltage comprises raising the first voltage if the number of bits from the output is greater than the number of clock cycles divided by two.

20. The method of claim 17, wherein the number of bits derived from the number of bits from the output is a result of multiplying the number of bits from the output by two.

* * * * *